United States Patent
Gardaz

(10) Patent No.: US 9,535,265 B2
(45) Date of Patent: Jan. 3, 2017

(54) EYEGLASS FRAME WITH DECORATIVE PIECE

(71) Applicant: KILLINE OPTICAL LTD, Macao (CN)

(72) Inventor: Francois Gardaz, Macao (CN)

(73) Assignee: KILLINE OPTICAL LTD, Macao (MO)

( * ) Notice: Subject to any disclaimer, the term of this patent is extended or adjusted under 35 U.S.C. 154(b) by 0 days.

(21) Appl. No.: 14/395,794

(22) PCT Filed: Apr. 15, 2013

(86) PCT No.: PCT/IB2013/001059
§ 371 (c)(1),
(2) Date: Oct. 20, 2014

(87) PCT Pub. No.: WO2013/156857
PCT Pub. Date: Oct. 24, 2013

(65) Prior Publication Data
US 2015/0109571 A1 Apr. 23, 2015

(30) Foreign Application Priority Data
Apr. 19, 2012 (FR) ...................... 12 53598

(51) Int. Cl.
*G02C 11/02* (2006.01)
*G02C 5/14* (2006.01)

(52) U.S. Cl.
CPC ............ *G02C 11/02* (2013.01); *G02C 5/14* (2013.01); *G02C 5/146* (2013.01); *G02C 2200/22* (2013.01); *G02C 2200/32* (2013.01)

(58) Field of Classification Search
CPC ............ G02C 5/14; G02C 5/146; G02C 5/16; G02C 11/00; G02C 11/02; G02C 2200/22
(Continued)

(56) References Cited

U.S. PATENT DOCUMENTS

| 3,582,192 A | 6/1971 | Gitlin |
| 4,903,375 A | 2/1990 | DiFranco |

(Continued)

FOREIGN PATENT DOCUMENTS

| CN | 2423596 Y | 3/2001 |
| CN | 2909306 Y | 6/2007 |

(Continued)

OTHER PUBLICATIONS

International Search Report issued Oct. 24, 2013 re: Application No. PCT/IB2013/001059.

*Primary Examiner* — Huy K Mai
(74) *Attorney, Agent, or Firm* — Cantor Colburn LLP

(57) ABSTRACT

Frame (2) for eyeglasses having an optical face (3) and two side arms (4) joined with hinges onto the two end portions (30) of said optical face, each side arm (4) having an inner longitudinal surface (42) and an outer longitudinal surface (43), and a front end surface (44) extending transversely to the longitudinal surfaces over a front end of said side arm, said front end surface extending to face a rear end surface (31) of the relevant end portion of the optical face when the side arm is in the open position, said frame further including at least one means for receiving a decorative piece (6), wherein the or each receiving means consists of a slotted hole (45) formed in one side arm and opening only into its front end surface or of a slotted hole formed in an end portion of the optical face and opening only into its rear end surface, the said or each slotted hole being designed to form a slide channel for receiving the decorative piece.

8 Claims, 3 Drawing Sheets

(58) Field of Classification Search
USPC .............................. 351/51, 52, 111, 119, 121
See application file for complete search history.

(56) References Cited

U.S. PATENT DOCUMENTS

| | | | | |
|---|---|---|---|---|
| 7,261,409 B1 * | 8/2007 | Taber | ...................... | G02C 11/02 |
| | | | | 351/51 |
| 7,874,668 B2 * | 1/2011 | Brousseau | ............. | G02C 11/02 |
| | | | | 351/52 |
| 2007/0242211 A1 | 10/2007 | Chao | | |
| 2011/0279769 A1 * | 11/2011 | Rhee | ...................... | G02C 11/02 |
| | | | | 351/52 |
| 2012/0075571 A1 | 3/2012 | Silver | | |

FOREIGN PATENT DOCUMENTS

| | | |
|---|---|---|
| CN | 2914124 Y | 6/2007 |
| CN | 201392436 Y | 1/2010 |
| CN | 202075512 U | 12/2011 |
| FR | 2886024 A1 | 11/2006 |

\* cited by examiner

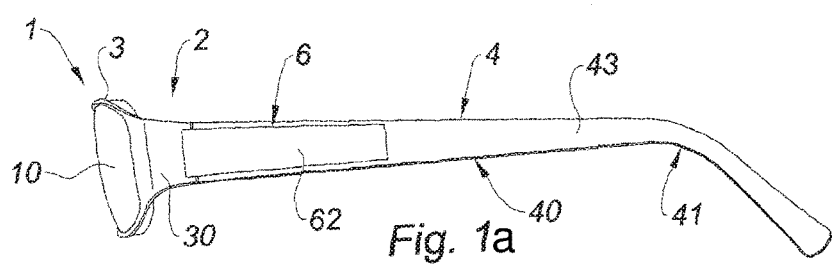
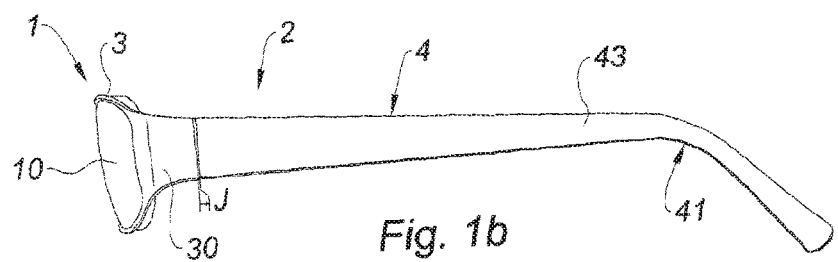
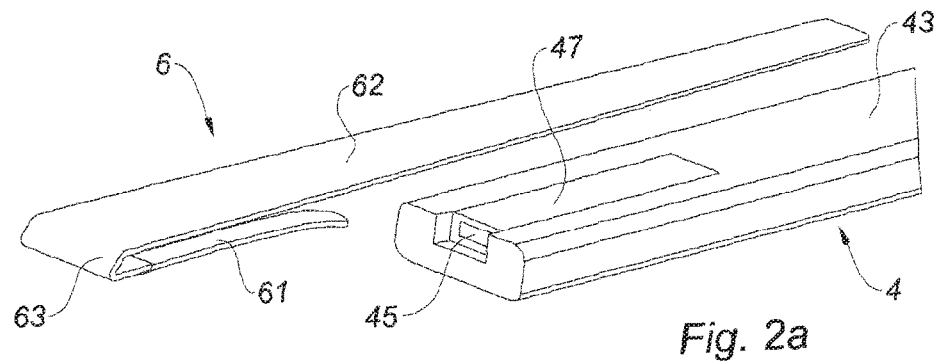
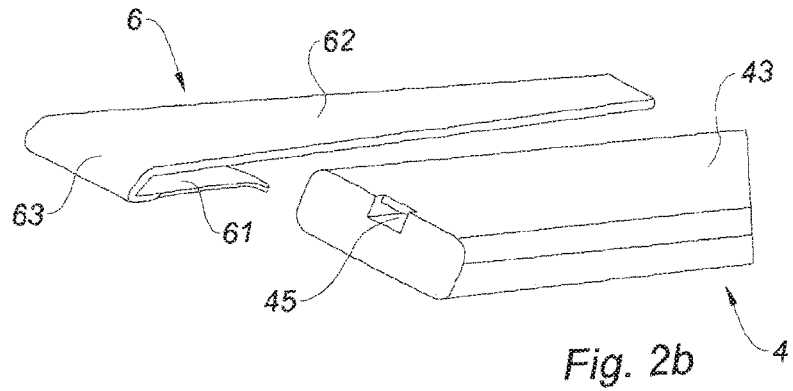

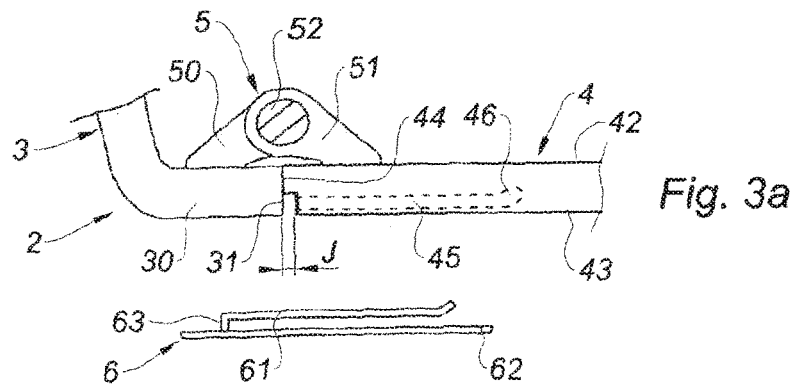
Fig. 3a
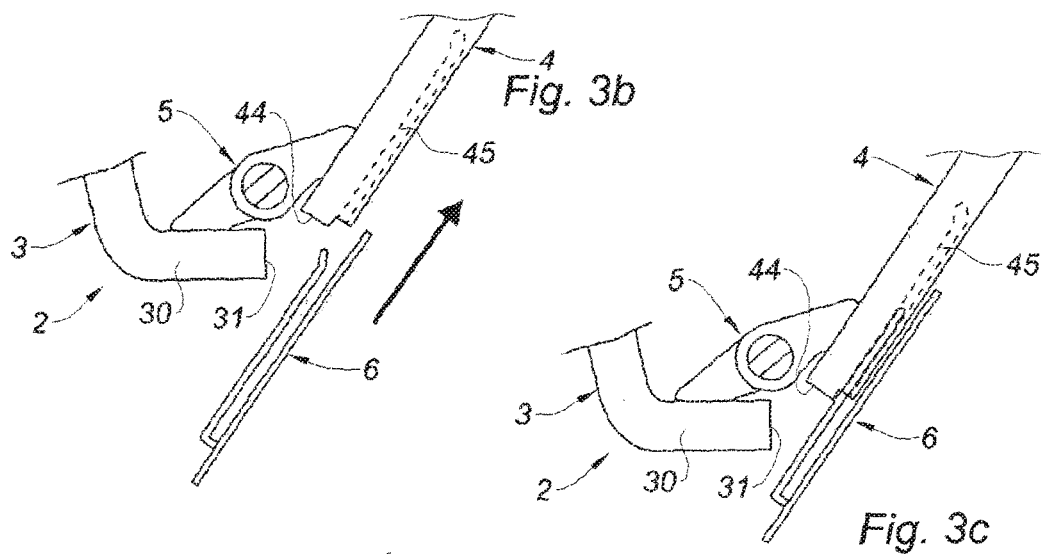
Fig. 3b
Fig. 3c
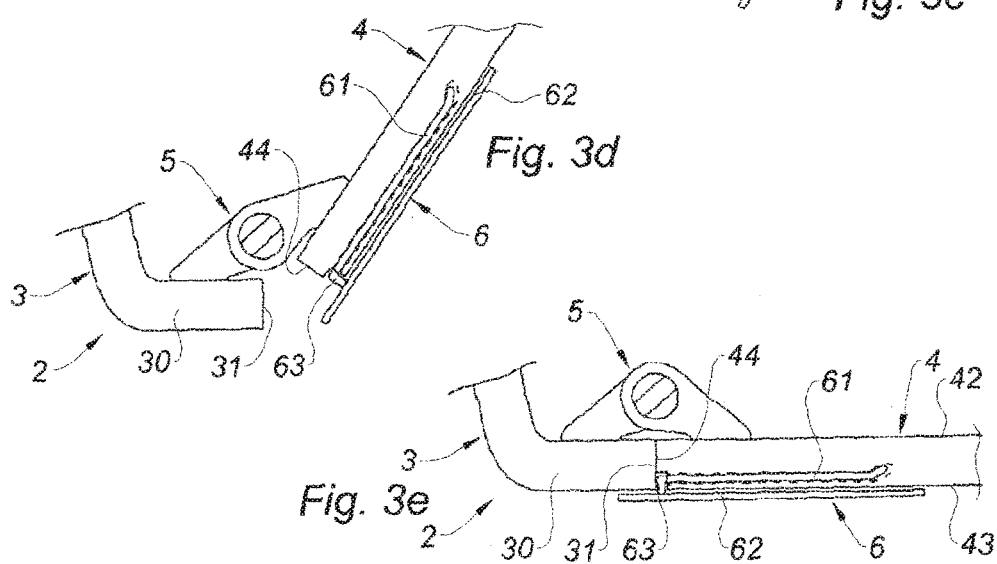
Fig. 3d
Fig. 3e

EYEGLASS FRAME WITH DECORATIVE PIECE

TECHNICAL FIELD

The present invention relates to a frame for eyeglasses, an optical assembly comprising such a frame decorated by means of a decorative piece designed to be attached temporarily on such a frame and the corresponding glasses.

BACKGROUND

In a known manner, eyeglasses comprise of a frame designed for holding the lenses to be worn by a user. The frame includes an optical face meant for accommodating the lenses, with or without the circle, and two side arms joined with hinges onto two end portions of the optical face between an open position (with the side arms deployed or extended in order for the eyeglasses to be worn) and a closed position (with the side arms folded against the optical face).

Conventionally, a side arm has at least one inner longitudinal surface that is not visible when the eyeglasses are worn, and at least one outer longitudinal surface that is visible when the eyeglasses are worn. The side arm may also have various different cross sectional shapes, such as flat, circular, triangular, rectangular, square, etc. Thus, a side arm with flat cross section has two inner and outer longitudinal surfaces that are substantially planar, a side arm with circular cross section has two inner and outer longitudinal surfaces that are curved, a side arm with triangular cross section has one inner longitudinal surface that is planar and two outer longitudinal surfaces that are flat and bevelled, a side arm with a rectangular or square cross section has one inner longitudinal surface that is planar and three planar longitudinal surfaces respectively on the lateral-, upper- and lower sides, etc. A side arm also has a tiny front end surface extending transversely to the two longitudinal surfaces over a front end of the arm, and more particularly extending substantially orthogonally to the main longitudinal direction of the side arm.

The articulated joint is generally in the form of a hinge comprising a fixed knuckle mounted on the end portion of the optical face, a movable knuckle attached to the front end of the side arm, in particular on its inner longitudinal surface, and a hinge pin (joint axis) linking the two knuckles in rotation and extending in a substantially parallel manner to the front end surface of the side arm and substantially orthogonally to the main longitudinal direction of the side arm.

When the side arm is opened, the front end surface of the side arm is facing a rear end surface of the relevant end portion of the optical face. This end portion may be present in the form of a tenon projecting towards the rear of the optical face or indeed of a portion of the optical face extending over the exterior alongside the lenses.

To decorate a frame for eye glasses, it is a known practice from the document U.S. Pat. No. 3,582,192 A to provide a decorative piece for the eyeglass side arm which is slidably mounted around the side arm, the side arm forming a rail over which has been slid the decorative piece with U shaped cross section. In order to hold this decorative piece in place, a compressible and magnetic strip is provided on the outer longitudinal surface of the side arm.

From the document US 2007/0242211 it is also a known practice to provide a notch forming a dovetail slide channel on the outer longitudinal surface of the side arm to receive a decorative piece which is slidably engaged in this slide channel.

From the document FR 2 886 024 A1 it is also a known practice to attach an ornamental element, embellishing trim on the eyeglass side arm, by means of a groove provided on the front end of the inner face of the side arm for receiving a hook of the embellishing trim, a hole provided on the outer longitudinal surface of the arm, on the side of its rear end, for receiving a droplet pin of the embellishing trim, and a retaining element disposed in a recess provided on the outer longitudinal surface of the side arm, between the front end and the hole, this retaining element being in particular a magnet, an adhesive strip, a snap-in locking mechanism, or a hook and loop strip fastening system.

These eyeglasses however present the disadvantage that, once the decorative piece is removed, the arm present is very unattractive, both with respect to the eye glasses in document U.S. Pat. No. 3,582,192 A where the compressible and magnetic strip remains in place, for the eye glasses in US 2007/0242211, where the notch remains visible, and for the eye glasses in FR 2 886 024 A1 where not only the groove, the hole and/or the retaining element remain visible once the embellishing trim has been removed, but also the misalignment of the outer surfaces of the side arm and the end portion of the optical face, such that it is not aesthetically recommended to do without the decorative pieces with such frames.

Furthermore, from the document U.S. Pat. No. 4,903,375 it is also a known practice to provide for the mounting of a spring clip on a side arm of the eye glasses in order for them to be supported over a garment pocket. The fastening of the spring clip on the side arm is obtained by means of spring rings which tighten one appendage of the clip against the arm; these rings being furthermore engaged in annular notches provided on the circumference of the arm. Over and above the difficulty of engaging the appendage of the clip in the rings, the annular notches and the rings on the side arm are particularly unsightly and unappealing, especially when the clip is not present.

BRIEF SUMMARY

The present invention seeks to overcome these drawbacks by providing a frame for eyeglasses and a decorative piece shaped for cooperating together so as to change the appearance of the frame, while not adversely affecting the aesthetics of the frame once the decorative piece is removed, thereby allowing the decorative piece to be turned into an optional means of modifying the appearance of the side arm.

To this end, it provides an eyeglass frame having an optical face designed to accommodate the lenses and two side arms joined with hinges (articulated) on the two end portions of said optical face between an open position and a closed position, each side arm having at least one inner longitudinal surface and at least one outer longitudinal surface extending along the length of the arm, and a front end surface extending transversely to the longitudinal surfaces over a front end of said side arm, said front end surface extending so as to face a rear end surface of the relevant end portion of the optical face when the side arm is in the open position, said frame further including at least one means for receiving a decorative piece designed to be attached in a temporary manner to said frame, this frame being remarkable in that the said or each receiving means comprises a slotted hole formed in a side arm and opening only in its front end surface or of a slotted hole formed in an end portion of the optical face and opening only in its rear end surface, the or each slotted hole being designed to form a slide channel for receiving the decorative piece.

In this manner, this frame is particularly advantageous insofar as the slide channel for receiving and temporarily holding the decorative piece is provided in the form of a slotted hole, which opens only in the front end surface of the side arm or in the rear end surface of the end portion of the optical face, in a manner such that this slotted hole is not visible from the side when the side arm is in the open position, except in the event of the side arm being made out of a transparent material.

Thus, in order to insert the decorative piece, it is necessary to simply close the side arm, or in other words, to at least partially fold the latter against the optical face, to uncover the slotted hole that will receive the decorative piece. In the absence of the decorative piece and, when the eyeglasses are worn, the slotted hole is invisible from the side, except in the event of the side arm being made out of a transparent material, and therefore the appearance of the side arm is mainly unchanged. The or each slotted hole extends parallel to the main longitudinal direction of the side arm when the side arm is in the open position.

According to one characteristic feature, the or each slotted hole has, from the relevant end surface, a lead in portion that is rectilinear and extended by a terminal portion that is inclined relative to the lead in portion to form an interior ramp.

Such a shape is particularly advantageous for ensuring the resilient holding of the decorative piece in the slotted hole; this decorative piece having a pin that is described with more precision later, which could be released by spring force in this ramp and thus get locked inside the hole.

In one particular embodiment, the or each slotted hole is formed in the constituent material of the side arm or of the end portion of the optical face.

In another embodiment, the slotted hole is provided in an insert fixed in a notch formed in the side arm or in the end portion of the optical face.

According to one possibility of the invention, the or each slotted hole opens into an end surface and comes to be directly in front of the other end surface so as to face it when the side arm is in the open position, such that said slotted hole is covered by this other end surface facing it when the side arm is in the open position.

If the slotted hole is formed in a side arm then this slotted hole is covered by the rear end surface of the end portion of the optical face, whereas if the slotted hole is formed in the end portion of the optical face then this slotted hole is covered by the front end surface of the side arm, in a manner such that the slotted hole is practically invisible when the side arm is open.

According to another possibility of the invention, the end portions of the optical face are substantially contiguous, and are preferably flush, with the outer longitudinal surfaces of the side arms, a clearance being provided between the front end surface and rear end surface respectively, of said side arms and said end portions. One such clearance is necessary to allow the passage of the linking element of the decorative piece described with greater precision here below.

The invention also relates to an optical assembly for eyeglasses comprising of the following:
a frame according to the invention; and
at least one decorative piece comprising of at least one resiliently deformable pin designed to be slid into at least one slotted hole of the frame, at least one decorative element designed to extend to the exterior of the slotted hole and the frame, in particular facing the outer longitudinal surface of the side arm and/or facing the end portion of the optical face, and a linking element between the pin and the decorative element;
wherein the or each pin is engaged and held within a slotted hole of the frame, the linking element extends between the two relevant end surfaces of the side arm and of the optical face when said arm is in the open position, and the decorative element extends to the exterior of the slotted hole and the frame.

Thus, the or each pin serves to hold the decorative piece on the frame by being inserted within a slotted hole, and the decorative element forms the decorative part intended to modify the appearance of the frame. This decorative piece can also be used as a clip for attaching the eyeglasses onto a support, such as a garment pocket, or like a pendant on a chain.

Advantageously, the pin has a curved shape, with in particular a rectilinear initial portion extended by a curved terminal portion, thereby enabling its locking by spring force within the slotted hole of the frame.

In a particular embodiment, the outer appendage is substantially flat, so as to remain relatively inconspicuous on the side arm.

The invention also relates to eyeglasses including an optical assembly as described here above.

BRIEF DESCRIPTION OF THE DRAWINGS

Other characteristic features and advantages of the present invention shall become apparent upon reading the detailed description here below of several examples of implementation provided without limitation, with reference made to the appended figures wherein:

FIGS. 1*a* and 1*b* are schematic side views of eyeglasses according to the invention with the side arm open and respectively with and without the decorative piece;

FIGS. 2*a* and 2*b* are schematic views in perspective of the first and second side arms for frames in accordance with the invention, for which the slotted holes are formed in the side arms;

FIGS. 3*a* to 3*e* are schematic top and partial views of a frame according to the invention, at various stages of assembly of the decorative piece on a side arm of the frame;

DETAILED DESCRIPTION

Figure 4A:
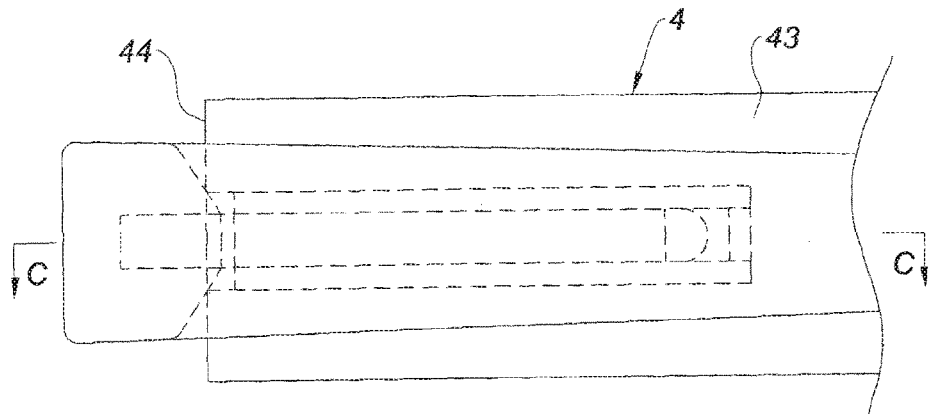
FIG. 4*a* is a schematic side view of a side arm for a frame according to the invention with a decorative piece.

The eyeglasses 1 in accordance with the invention are described with reference made to FIGS. 1 to 5 in which the same reference numerals are used to illustrate the identical or similar pieces and parts.

The eyeglasses 1 are comprised of two lenses 10 supported by a frame 2 including:
an optical face 3 to support the lenses 10 with or without the circle; and
two side arms 4, right and left respectively, hinged onto the optical face 3 by means of hinge type joints 5.

Figure 5:
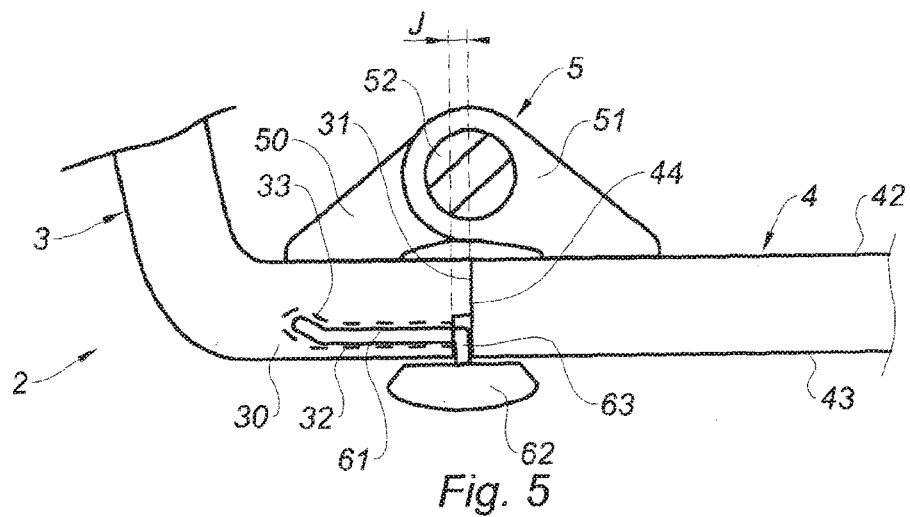
FIG. 5 is a schematic top and partial view of a frame according to the invention, with a decorative piece mounted on a tenon of the optical face of the frame.

The optical face 3 has two end portions 30, respectively right and left, on which the side arms are joined by hinges, and may be presented in the form of tenons in the examples of FIGS. 1, 3 and 5. Each tenon 30 has a rear end surface 31 substantially parallel to the hinge pin (joint axis) 52 of the corresponding hinge 5.

The side arm 4 includes essentially of two parts, namely a front portion 40 that is rectilinear and hinged onto the face 3 and extending along a main longitudinal direction, and a rear portion 41, generally curved, designed to go around the back of the ear and to be supported on the ear.

The side arm 4 has an inner longitudinal surface 42 and an outer longitudinal surface 43, and a front end surface 44 extending transversely to the two longitudinal surfaces 42, 43 over a front end of the side arm 4. Each front end surface 44 is substantially orthogonal to the longitudinal direction of the side arm 4, and substantially parallel to the rear end surface 31 of the corresponding tenon 3 when the side arm 4 is open.

When the side arm 4 is open, the front end surface 44 is not visible from the side as it is substantially contiguous to the rear end surface 31 of the tenon 3 by coming face to face with the latter with only a small clearance J between the two end surfaces 44, 31, only the outer longitudinal surface 43 being visible, as is the outer surface of the tenon 3 which goes along the length of the outer longitudinal surface 43 of the side arm 4.

Figure 4B:
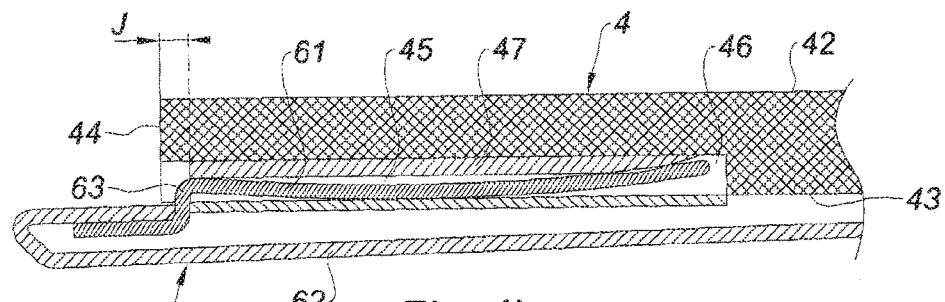
FIG. 4*b* is a schematic view in a longitudinal cross section, along the plane of cross section C-C, of the side arm in FIG. 4*a*.

In the embodiments of FIGS. 2 to 4, each side arm 4 has a blind slotted hole 45 opening into the front end surface 44 and extending orthogonally to said front end surface 44, in other words along the longitudinal direction of the side arm 4. As shown in FIGS. 3 and 4b, the slotted hole 45 has, from the front end surface 44, a rectilinear lead in portion having a substantially constant cross section and extended by a terminal portion inclined towards the inside of the side arm 4 in relation to the lead in portion and thereby defining an inner ramp 46.

In the example in FIGS. 2b and 3, the slotted hole 45 is formed in the constitutive material of the side arm 4, therefore directly within the side arm 4. In the example in FIGS. 2a and 4, the slotted hole 45 is provided within an insert 47 mounted in a notch provided in the side arm 4, and more specifically in the longitudinal outer surface 43; the insert 47 thus being visible from the side when the eyeglasses 1 are worn, but not the slotted hole 45.

In the embodiment of FIG. 5, each tenon 30 has a blind slotted hole 32 opening into the rear end surface 31 and extending orthogonally to said rear end surface 35, in other words, in the longitudinal direction of the side arm 4 when it is open. The slotted hole 32 has, from the rear end surface 31 a rectilinear lead in portion of substantially constant cross section and extended by a terminal portion inclined towards the inside of the tenon 30 in relation to the lead in portion and thereby defining an inner ramp 33.

The hinged joint 5 comprises a fixed knuckle 50 attached onto the tenon 30 of the optical face 3 and a movable knuckle 51 attached to the inner longitudinal surface 42 of the side arm 4, with a hinge pin 52 connecting in rotation the two hinge knuckles 50, 51.

In accordance with the invention, the eyeglasses 1 also comprise at least two decorative pieces 6, at least one decorative piece 6 per side arm 4 and/or at least one decorative piece 6 per tenon 3. Each decorative piece 6 comprises of a resiliently deformable pin 61 forming an elongated stem adapted to engage and be held within the slotted hole 45, 32 of the side arm 4 or of the relevant tenon 30. It is also possible to provide a decorative piece 6 having multiple pins 61 which engage in multiple slotted holes 45 or 32.

The decorative piece 6 further comprises a decorative element 62 that is linked to the pin 61 by means of a linking element 63, this decorative element 62 being designed to extend to the exterior of the slotted hole 45, 32 and come in front of the outer longitudinal surface 43 of the side arm 4 and/or of the tenon 30 on the outer side.

The pin 61 has a curved shape, with a free end which is curved in the direction opposite to the decorative element 62 by moving away from it, and is made out of a resiliently deformable material such as metal or plastic.

The decorative piece 6 may be made integrally of one piece or by assembling multiple elements joined to each other for example by welding, gluing, etc. The decorative element 62 may have various shapes and configurations, such as for instance, a flat piece like in the examples in FIGS. 1 to 4, or a protuberance as in the example in FIG. 5, for instance in the shape or form of a button, ball, butterfly, flower, etc.

In order to attach the decorative piece 6 onto the frame 2, it is firstly necessary to close, at least partially, the side arm 4, as shown in FIGS. 3b to 3d, from the open position shown in FIG. 3a, so as to allow access to the slotted hole 45 or 32. Then it is necessary to insert the pin 61 of the decorative piece 6 into the slotted hole 45 or 32, until the curved end of the pin 61 is resiliently stretched out at the level of the interior ramp 46 or 33 in order to ensure the locking of the pin 61 in the slotted hole 45 or 32. And finally the side arm 4 may be reopened, as illustrated in FIG. 3e, so as to enable the wearing of the eyeglasses 1.

A clearance J is provided between the front end surface 44 of the side arm 4 and the rear end surface 31 of the tenon 30, this clearance J being at least equivalent to the thickness of the linking element 63 of the decorative piece 6 so that it does not interfere with the complete opening of the arm 4 as shown in FIGS. 3e and 5. In the embodiments of FIGS. 2 to 5, the slotted hole 45 or 32 opens backwards set back from the relevant end surface 44 or 31 by a depth equivalent to this clearance J needed for the passing of the linking element 63.

Obviously indeed, the implementation example discussed here above is presented without any limitations, and other improvements and details may be made attributed to the eyeglasses according to the invention without however departing from the scope of the invention where other forms of joints may for example be fabricated.

The invention claimed is:

1. A frame for eyeglasses comprising an optical face designed for accommodating the lenses and two side arms joined with hinges onto the two end portions of said optical face between an open position and a closed position, each side arm having at least one inner longitudinal surface and at least one outer longitudinal surface extending along the length of the side arm, and a front end surface extending transversely to the longitudinal surfaces over a front end of said side arm, said front end surface extending to face a rear end surface of the relevant end portion of the optical face when the side arm is in the open position, said frame further including at least one means for receiving a decorative piece designed to be attached in a temporary manner to said frame, wherein the said or each receiving means comprises a slotted hole formed in one side arm and opening only into its front end surface or of a slotted hole formed in an end portion of the optical face and opening only into its rear end surface, the said or each slotted hole being designed to form a slide channel for receiving the decorative piece and wherein the or each slotted hole has, from the relevant end surface, a lead in portion that is rectilinear and extended by a terminal portion that is inclined relative to the lead in portion to form an interior ramp.

2. A frame according to claim 1, wherein the or each slotted hole is either formed in the constituent material of the side arm or of the end portion of the optical face or is provided in an insert fixed in a notch formed in the side arm or in the end portion of the optical face.

3. A frame according to claim 1, wherein the or each slotted hole opens into an end surface and comes to be directly in front of the other end surface so as to face it when the side arm is in the open position, such that said slotted hole is covered by the other end surface facing it when the side arm is in the open position.

4. A frame according to claim 1, wherein the end portions of the optical face are substantially contiguous, and are flush, with the outer longitudinal surfaces of the side arms, a clearance (J) being provided between the front end surface and rear end surface respectively, of said side arms and said end portions.

5. An optical assembly for eyeglasses comprising:
a frame according to claim 1; and
at least one decorative piece comprising of at least one resiliently deformable pin designed to be slid into at least one slotted hole of the frame, at least one decorative element designed to extend to the exterior of the slotted hole and the frame, in particular facing the outer longitudinal surface of the side arm and/or facing the end portion of the optical face and a linking element between the pin and the decorative element,
and wherein the or each pin is engaged and held within a slotted hole of the frame, the linking element extends between the two relevant end surfaces of the side arm and the end portion of the optical face when said side arm is in the open position, and the decorative element extends to the exterior of the slotted hole and the frame.

6. An optical assembly according to claim 5, wherein the or each slotted hole has, from the relevant end surface, a lead in portion that is rectilinear and extended by a terminal portion that is inclined relative to the lead in portion to form an interior ramp and the pin of the decorative piece has a curved shape.

7. An optical assembly according to claim 6, wherein the pin of the decorative piece has a rectilinear initial portion extended by a curved terminal portion.

8. Eyeglasses including an optical assembly according to claim 5.

* * * * *